United States Patent
Palauschek et al.

(10) Patent No.: US 8,426,665 B2
(45) Date of Patent: Apr. 23, 2013

(54) PROCESS AND PLANT FOR PRODUCING HYDROCARBONS

(75) Inventors: Norbert Palauschek, Idstein (DE); Peter Trabold, Darmstadt (DE); Helmut Heurich, Bad Homburg (DE); Manfred Hoffmann, Wehrheim (DE)

(73) Assignee: Lurgi GmbH, Frankfurt am Main (DE)

( * ) Notice: Subject to any disclaimer, the term of this patent is extended or adjusted under 35 U.S.C. 154(b) by 323 days.

(21) Appl. No.: 12/811,394

(22) PCT Filed: Nov. 25, 2008

(86) PCT No.: PCT/EP2008/009963
§ 371 (c)(1),
(2), (4) Date: Jul. 1, 2010

(87) PCT Pub. No.: WO2009/089866
PCT Pub. Date: Jul. 23, 2009

(65) Prior Publication Data
US 2010/0286453 A1  Nov. 11, 2010

(30) Foreign Application Priority Data

Jan. 14, 2008  (DE) .......................... 10 2008 004 406

(51) Int. Cl.
*C07C 1/213* (2006.01)
(52) U.S. Cl.
USPC ............. 585/733; 585/14; 585/310; 585/932
(58) Field of Classification Search ................. 585/733, 585/752, 932
See application file for complete search history.

(56) References Cited

U.S. PATENT DOCUMENTS

| 4,992,605 A | 2/1991 | Craig et al. |
| 7,816,570 B2 * | 10/2010 | Roberts et al. ................. 585/240 |
| 2007/0135663 A1 | 6/2007 | Aalto et al. |

FOREIGN PATENT DOCUMENTS

| EP | 1681337 | 7/2006 |
| EP | 1728844 | 12/2006 |
| FR | 862678 | 3/1941 |
| FR | 873112 | 6/1942 |
| WO | 2008103204 A2 | 8/2008 |
| WO | WO-2008/093990 | 8/2008 |

OTHER PUBLICATIONS

Page 3 of Hui, Y H., "Bailey's Industrial Oil and Fat Products—Edible Oil and Fat Products: Processing Technology", John Wiley, 1 page. (Only p. 3 provided with International Search Report, attached, (1996).
International Search Report, mailed Apr. 1, 2009 with English translation, 6 pages.
Eisenbrand, G. et al., "Römpp Lexikon Lebensmittelchemie, Fetthärtung", "Römpp Encyclopedia of Food Chemistry, Fat Hardening," Jan. 1, 1995, Römpp Lexikon Lebensmittelchemie, Thieme, Stuttgart; New York, XP001562273, ISBN: 978-3-13-736601-0, p. 274, cover page and back page, with English Translation of p. 274.

* cited by examiner

*Primary Examiner* — Brian J Davis
(74) *Attorney, Agent, or Firm* — Pauly, Devries, Smith & Deffner, L.L.C.

(57) ABSTRACT

When producing hydrocarbons from fatty acid esters contained in fats or fat oils, the fatty acid esters initially are split up by hydrolytic decomposition into a first stream containing crude alcohol and water and a second stream containing free fatty acids, and subsequently the free fatty acids of the second stream are hydrogenated with hydrogen to obtain saturated hydrocarbons.

12 Claims, 3 Drawing Sheets

PROCESS AND PLANT FOR PRODUCING HYDROCARBONS

CROSS-REFERENCE TO RELATED APPLICATIONS

This application is a national stage application under 35 U.S.C. 371 of International Patent Application Serial No. PCT/EP2008/009963, entitled "Verfahren and Anlage zur Herstellung von Kohlenwasserstoffen," filed Nov. 25, 2008, which claims priority from German Patent Application No. 10 2008 004 406.7, filed Jan. 14, 2008.

FIELD OF THE INVENTION

This invention relates to a process for producing hydrocarbons from fatty acid esters contained in animal fats or vegetable oils, in particular triglycerides, and to a plant for performing this process.

BACKGROUND OF THE INVENTION

In connection with crude oil shortage, there is a search for alternative raw material sources for fuel production. Thus, there is an increasing tendency to develop biological fuels from natural raw materials, such as rapeseed oil, palm oil or the like, which are admixed to the mineral fuels. For this purpose, glycerol esters (triglycerides), which are obtained for instance by pressing and/or extraction from oil-bearing fruits and oilseeds, are converted to saturated, largely unbranched hydrocarbons in a catalytic hydrogenation. During hydrogenation, the glycerol skeleton is converted to propane, so that no valuable substance can be obtained. In addition, double bonds are saturated by hydrogen. The carboxyl groups likewise are saturated by hydrogen or split off as carbon dioxide. Since the crude esters contain impurities which disturb the hydrogenation, an expensive cleaning is necessary in dependence on the raw material and catalyst used.

In FIG. 1, such known process is illustrated schematically. The crude fatty acid glycerol esters are cleaned up in a multistage process, wherein metals and phosphatides are removed by desliming to a content of <20 ppm of phosphatides. In the subsequent bleaching, the content of phosphatides can be reduced to 5 ppm. By thermal deacidification, free fatty acids finally are removed. The fatty acid glycerol esters obtained subsequently are hydrogenated by adding hydrogen, wherein a mixture of saturated hydrocarbons and propane is obtained, which is separated by distillation. The hydrocarbons of higher molecular weight then can further be refined or directly be admixed to the fuels. The further cleaning of propane only is worthwhile in exceptional cases; therefore, it can at best be utilized thermally as heating gas. In general, an economically unsatisfactory yield is obtained, since the value of the saturated hydrocarbons obtained mostly is lower than the value of the feedstocks.

A similar process is known from EP 1 728 844 A1, wherein from biological feedstocks, such as corn, rapeseed, soybean or palm oil, part of the impurities are removed by pretreatment with an acidic ion exchanger resin and a first stream is generated, which subsequently is hydrogenated, in order to obtain a reaction product with a hydrocarbon fraction which includes n-paraffins usable as diesel.

From U.S. Pat. No. 4,992,605 there is also known a process for producing higher-valent hydrocarbons for admixture to diesel fuel, wherein vegetable oils are catalytically hydrogenated, in order to convert the feedstocks to higher-chain unbranched paraffins.

However, these processes also have in common that the vegetable oils must be subjected to an expensive precleaning before hydrogenation, since the catalyst of the succeeding hydrogenation is susceptible to impurities. A variable cleaning quality can lead to a reduced activity of the catalyst, a lower availability of the production plant and therefore higher costs. In addition, crude esters of the feedstocks are in part lost due to cleaning, so that the efficiency of the process is impaired. The glycerol skeleton is hydrogenated to propane, which due to its low value can at best be utilized thermally. In addition, the hydrogenation of the glycerol skeleton involves a higher consumption of hydrogen, whereby the operating costs are increased. Fats of inferior quality cannot be used, so as not to damage the catalyst during hydrogenation.

SUMMARY OF THE INVENTION

Therefore, it is the object of the invention to avoid the above-mentioned disadvantages and provide a more economic process for producing fuels from biological feedstocks.

This object substantially is solved with the invention in that the fatty acid esters are directly subjected to a hydrolytic decomposition without pretreatment and are split up into a first stream containing crude alcohol and water and a second stream containing free fatty acids. This first step provides for using contaminated and therefore less expensive feedstocks. The free fatty acids of the second stream then are hydrogenated with hydrogen to obtain saturated hydrocarbons. By omitting the precleaning necessary in the prior art, a substantial saving of costs is obtained. The crude alcohol is withdrawn directly after the hydrolytic decomposition, so that it no longer passes through the hydrogenation stage. Merely the free fatty acids are hydrogenated, so that the withdrawal of crude alcohol from the feed stream results in a lower consumption of hydrogen for hydrogenation.

In accordance with a preferred aspect of the invention, the crude alcohol is glycerol. The usual basic substances for producing biodiesel from rapeseed oil, palm oil or the like are triglycerides, which are decomposed into glycerol and free fatty acids by hydrolysis.

In accordance with the invention, the separation of the fatty acids from glycerol upon hydrolysis is effected by liquid-liquid phase separation.

In accordance with a development of the invention, the first stream containing glycerol and water subsequently is evaporated to a glycerol concentration of >80 wt-%, preferably about 88 wt-%. The water obtained during evaporation then can be recirculated to the hydrolysis, whereby the supply of decomposition water required for hydrolysis is reduced correspondingly. The glycerol obtained thus can be utilized as valuable substance without further processing.

If glycerol is intended for use in the pharmaceutical industry, it can be cleaned up by distillation to a concentration of >95 wt-%, preferably up to 99.8 wt-%, and can subsequently be bleached with activated carbon. The sales value of glycerol thereby is increased considerably.

If necessary, the second stream obtained during hydrolysis is separated into a third stream substantially containing the fatty acids and a fourth stream containing impurities, preferably by distillation or rectification. Thus, a substantially pure stream of free fatty acids is supplied to the hydrogenation, in order to protect the catalyst provided for hydrogenation. The heavy distillation residue, which contains the impurities, is discharged in accordance with the invention or partly recirculated to the hydrolysis for increasing the yield.

The cleaned fatty acids are hydrogenated with hydrogen in the presence of a usual hydrogenation catalyst to obtain saturated hydrocarbons, in particular n-paraffins.

Depending on the intended use of the saturated hydrocarbons obtained, the same can at least partly be isomerized to isoparaffins. The n-paraffins, however, also find application in special fields without further conversion.

The saturated hydrocarbons then are preferably used as additives in gasoline or diesel production.

This invention also relates to a plant for producing hydrocarbons from fatty acid esters contained in animal fats or vegetable oils, which is suitable for performing the process described above. The plant comprises a hydrolysis reactor, in which the fatty acid esters are split up with water into a first stream containing crude alcohol and water and a second stream containing free fatty acids, and a hydrogenation reactor, in which the fatty acids are hydrogenated with hydrogen to obtain saturated hydrocarbons.

Subsequent to the hydrolysis reactor, an evaporation plant is provided for separating the crude alcohol, in particular glycerol, from water. Via a return conduit, the water thus obtained can be recirculated to the hydrolysis reactor.

In accordance with the invention, the degree of purity of the crude alcohol is increased to more than 99 wt.-% in a first distillation stage, so that it can be employed in the pharmaceutical industry.

Between the hydrolysis reactor and the hydrogenation reactor a second distillation device is provided in accordance with a development of the invention, in which the second stream is separated into a third stream substantially containing the fatty acids and a fourth stream containing impurities.

The second distillation device is connected with the hydrolysis reactor via a return conduit, in order to partly recirculate the fourth stream containing the impurities, but also fatty acid esters not yet converted, to the hydrolysis reactor for yield increase.

Subsequent to the hydrolysis reactor an isomerization plant is provided in accordance with the invention, in which at least part of the n-paraffins obtained by hydrogenation are isomerized, as in some applications branched hydrocarbons are also required.

BRIEF DESCRIPTION OF THE FIGURES

Developments, advantages and possible applications of the invention can also be taken from the following description of embodiments and the drawing. All features described and/or illustrated form the subject-matter of the invention per se or in any combination, independent of their inclusion in the claims or their back-reference.

In the drawing.

DETAILED DESCRIPTION

Figure 1:
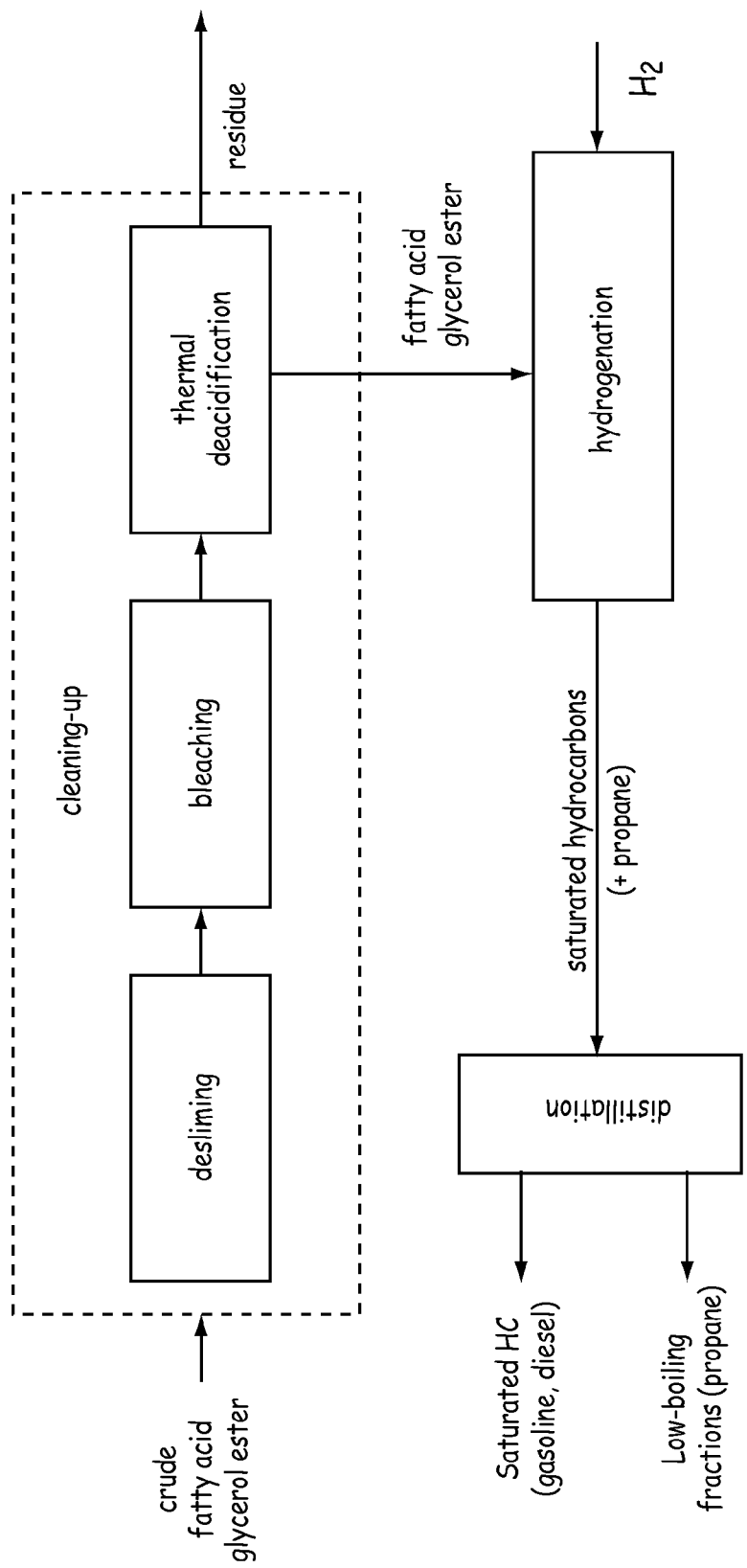
FIG. 1 schematically shows a plant for producing saturated hydrocarbons in accordance with the prior art, FIG. 2 schematically shows a plant for producing saturated hydrocarbons in accordance with a first embodiment of the invention, and FIG. 3 schematically shows a plant for producing saturated hydrocarbons in accordance with a second embodiment of the present invention.
Figure 2:
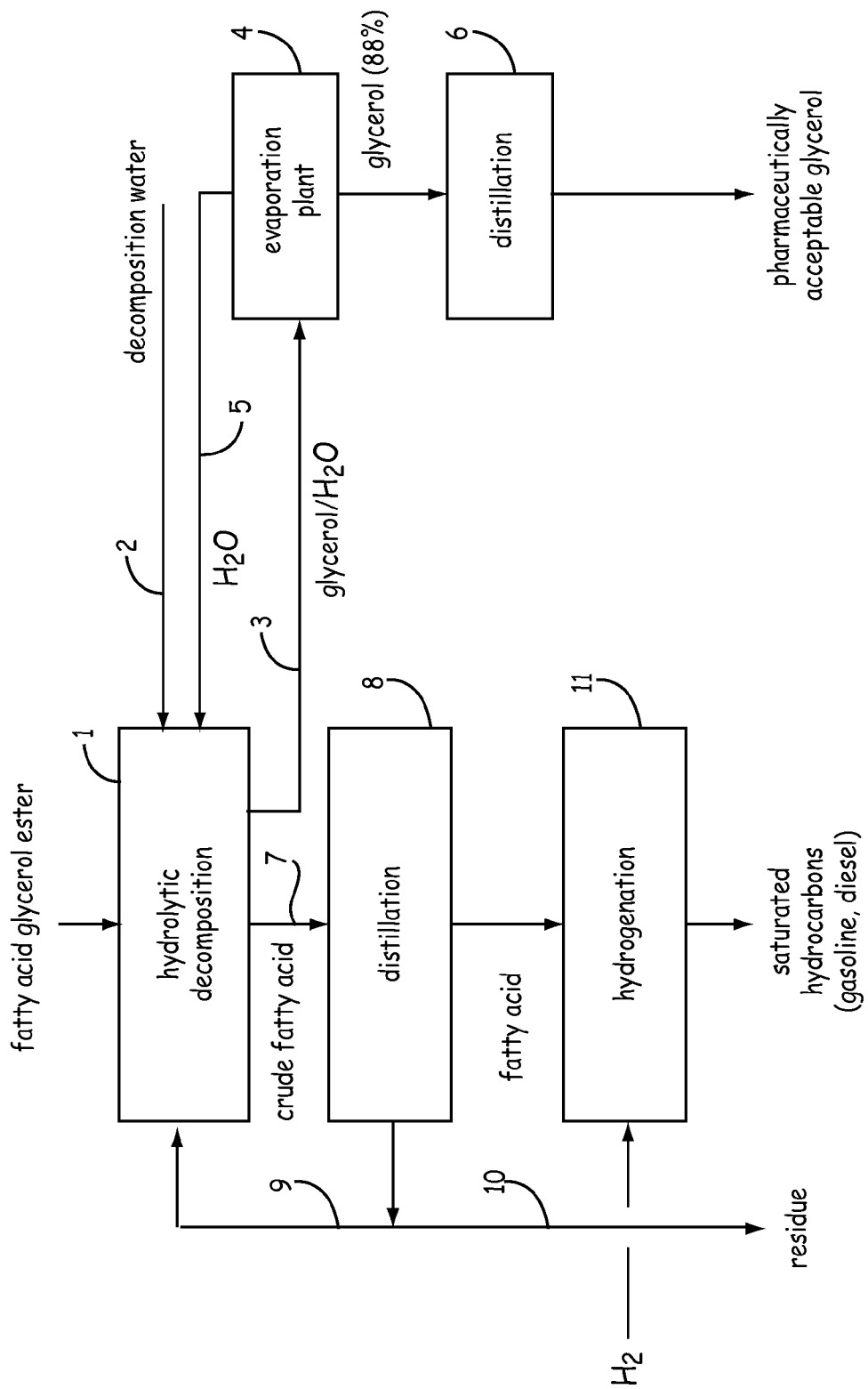

FIG. 2 shows a first embodiment of a plant for producing saturated hydrocarbons from natural raw materials, such as palm oil, rapeseed oil, tallow, waste fats or the like, which consist of fatty acid glycerol esters.

Without previous cleaning, the fatty acid glycerol esters are subjected to a hydrolytic decomposition in a hydrolysis reactor 1. Hydrolysis is effected by means of decomposition water, which is introduced into the hydrolysis reactor 1 via a water conduit 2 for instance with a pressure of 65 bar and a temperature of about 250° C. Instead of the decomposition water, steam or a mixture of liquid and vaporous water also can be used for hydrolysis. The fatty acid glycerol esters preferably are decomposed for more than 98%, in particular even more than 99% and separated into a first stream, which contains glycerol and water, and a second stream, which contains free fatty acids and impurities, by liquid-liquid phase separation.

Via a conduit 3, the glycerol and the water are supplied to an evaporation plant 4, in which the first stream, which contains about 12 to 32% glycerol, is evaporated to a glycerol concentration of about 88 wt-%. The water obtained thereby is recirculated to the hydrolysis reactor 1 via a return conduit 5 and supports the hydrolysis, so that the amount of decomposition water supplied via the water conduit 2 can be reduced correspondingly.

In a preferred aspect of the invention, the glycerol obtained in the evaporation plant 4 is cleaned up to a concentration of >99 wt-% in a first distillation device 6 and subsequently bleached with activated carbon, so that it can be employed as pharmaceutically acceptable glycerol.

If necessary, the second stream containing free crude fatty acids, which is discharged from the hydrolysis reactor 1 via a conduit 7, is largely separated from impurities in a second distillation device 8 and split up into a third stream substantially containing the fatty acids and a fourth stream substantially containing the impurities. The fourth stream can be recirculated to the hydrolysis reactor 1 via a return conduit 9, in order to increase the yield. At least part of the fourth stream is discharged via a discharge conduit 10.

The third stream containing the free fatty acids, which is discharged from the distillation device 8, is supplied to a possibly multistage hydrogenation reactor 11, in which the free fatty acids are hydrogenated to long-chain saturated hydrocarbons (n-paraffins), which then can be utilized as gasoline or diesel fuels or can be admixed to the same, by adding a suitable hydrogenating agent, in particular hydrogen ($H_2$), in the presence of a commercially available hydrogenation catalyst, for instance a cobalt, palladium or platinum catalyst on an alumina or silica substrate. Depending on the application, these saturated hydrocarbons are not, partly or completely isomerized in a succeeding step.

Figure 3:
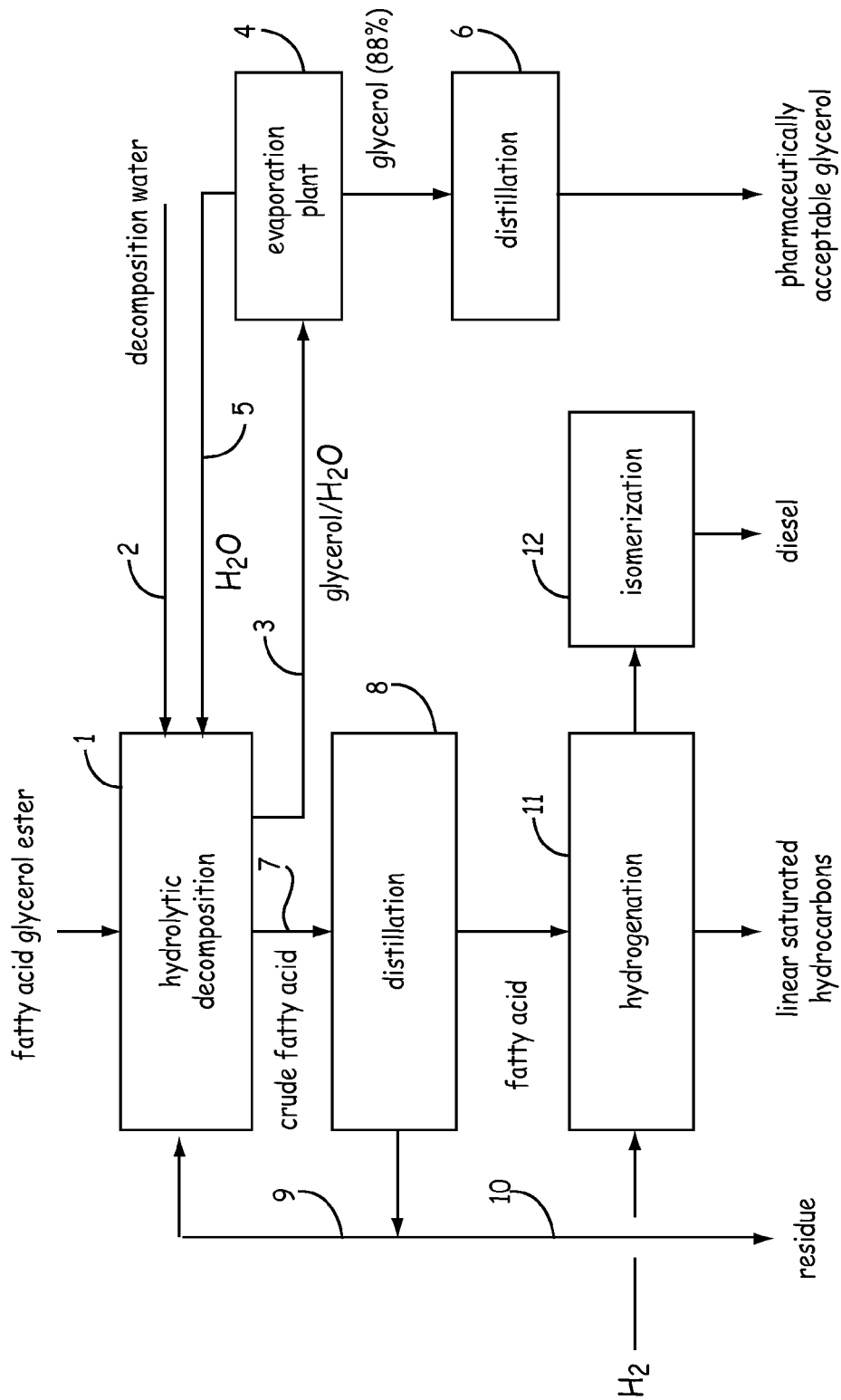

In the modified embodiment shown in FIG. 3, an isomerization plant 12 is provided subsequent to the hydrogenation reactor 11, to which at least part of the unbranched saturated hydrocarbons obtained by hydrogenation are supplied, in order to obtain saturated hydrocarbons branched by isomerization (isoparaffins), which can be used in particular in diesel fuels. The remaining, linear saturated hydrocarbons can be supplied to other suitable uses.

With the invention, an economic process for producing saturated hydrocarbons as fuel thus is proposed. In contrast to the prior art, an expensive precleaning before the hydrogenation reactor 11 is not required. The glycerol is separated by hydrolytic decomposition and can be utilized as valuable substance. As in the invention no hydrogenation of glycerol is effected, the amount of hydrogen supplied to the hydrogenation reactor 11 can distinctly be reduced.

As feedstocks for the plant of the invention the oil-bearing fruits and oilseeds conventionally used for biological fuels, but also animal fats and waste fats can be used. As a result, the range of application of the invention can further be increased.

EXAMPLE

To illustrate the economic efficiency of the process of the invention, 250 kt/a of fatty acid glycerol ester were introduced into the hydrolysis reactor 1 in an exemplary calculation. Upon decomposition and evaporation of the glycerol, 28 to 34 kt/a of glycerol (depending on the feedstock) were obtained in a concentration of 88 wt-%.

226 kt/a of fatty acid were supplied to the hydrogenation reactor 11, wherein a saving of hydrogen to be supplied to the hydrogenation reactor in an amount of up to 30% was obtained as compared to the prior art.

List of Reference Numerals
1 hydrolysis reactor
2 water conduit
3 conduit
4 evaporation plant
5 return conduit
6 first distillation device
7 conduit
8 second distillation device
9 return conduit
10 discharge conduit
11 hydrogenation reactor
12 isomerization plant

The invention claimed is:

1. A process for producing hydrocarbons from fatty acid esters contained in fats or fat oils, wherein the fatty acid esters are split up by hydrolytic decomposition into a first stream containing crude alcohol and water and a second stream containing free fatty acids, and wherein the free fatty acids of the second stream are hydrogenated with a suitable hydrogenating agent to obtain saturated hydrocarbons.

2. The process according to claim 1, wherein the crude alcohol is glycerol.

3. The process according to claim 1, wherein the separation into a first stream and a second stream is effected by liquid-liquid phase separation.

4. The process according to claim 2, wherein the first stream is evaporated to a glycerol concentration of >80 wt-%

5. The process according to claim 4, wherein the water obtained during evaporation is recirculated to the hydrolysis.

6. The process according to claim 4, wherein the glycerol is cleaned up by distillation to a concentration of >95 wt-%.

7. The process according to claim 1, wherein before hydrogenation the second stream is separated into a third stream containing the fatty acids and a fourth stream containing impurities.

8. The process according to claim 7, wherein the separation into the third and fourth streams is effected by distillation or rectification.

9. The process according to claim 7, wherein the third stream is hydrogenated with hydrogen to obtain saturated hydrocarbons.

10. The process according to claim 1 wherein the hydrogenation is effected in the presence of a hydrogenation catalyst.

11. The process according to claim 1 wherein the saturated hydrocarbons are at least partly isomerized to isoparaffins.

12. The process according to claim 7 wherein the fourth stream containing impurities is partly recirculated to the hydrolysis reactor.

* * * * *